United States Patent [19]
Shah

[11] Patent Number: 5,555,927
[45] Date of Patent: Sep. 17, 1996

[54] THERMOSTAT SYSTEM HAVING AN OPTIMIZED TEMPERATURE RECOVERY RAMP RATE

[75] Inventor: Dipak J. Shah, Eden Prairie, Minn.

[73] Assignee: Honeywell Inc., Minneapolis, Minn.

[21] Appl. No.: 479,292

[22] Filed: Jun. 7, 1995

[51] Int. Cl.$^6$ .............................. F23N 5/20; G05D 23/00
[52] U.S. Cl. ..................... 165/239; 236/46 R; 236/91 D
[58] Field of Search ........................... 62/231; 236/46 R, 236/91 D, 91 R; 165/12; 364/557

[56] References Cited

U.S. PATENT DOCUMENTS

| 4,632,177 | 12/1986 | Beckey . | |
|---|---|---|---|
| 4,674,027 | 6/1987 | Beckey . | |
| 4,702,305 | 10/1987 | Beckey et al. . | |
| 4,702,413 | 10/1987 | Beckey et al. . | |
| 5,025,984 | 6/1991 | Bird et al. . | |
| 5,219,119 | 6/1993 | Kasper et al. | 165/12 X |
| 5,270,952 | 12/1993 | Adams et al. . | |
| 5,346,129 | 9/1994 | Shah et al. . | |
| 5,361,983 | 11/1994 | Bird | 165/12 X |

Primary Examiner—William E. Wayner
Attorney, Agent, or Firm—John G. Shudy, Jr.

[57] ABSTRACT

An adaptive recovery method for a setback thermostat using the intersection of the space temperature with a sloped recovery temperature line which approximates the change in temperature as a function of time during recovery of the temperature controlled space from a setback temperature, to determine the time at which recovery to the occupancy temperature should begin. The thermostat starts recovery when the current space temperature crosses the recovery temperature line. A useful feature of the apparatus and method which implement the invention, computes and constantly updates the slope of the temperature recovery line. The update of the temperature recovery line slope is based on miss time, i.e., the time between actually achieving the desired next set point temperature and the next set point time associated with the next set point temperature, the space temperature, the outdoor air temperature, the temperature recovery ramp rate during the previous recovery period, and the current and past thermal time constants. If the heating or cooling load on the space changes, the current space temperature will cross the recovery temperature line at a different time, causing recovery to start at a time more compatible with the current heating or cooling load in order to complete recovery at or near the desired time. Variables may be added to the system.

11 Claims, 5 Drawing Sheets

THERMOSTAT SYSTEM HAVING AN OPTIMIZED TEMPERATURE RECOVERY RAMP RATE

BACKGROUND OF THE INVENTION

One relatively simple procedure for saving on the costs of heating or cooling a space is to change the set point temperature for the thermostat in it when the space is not occupied, or in the case of a home, at night when the occupants are sleeping. However, since it is not physically possible to warm up or cool down the controlled space instantaneously to maintain comfort for the occupants, it is necessary for the space temperature control unit (furnace or air conditioner) to begin changing space temperature prior to the time when occupancy is scheduled again to occur. One hereafter refers to the time of day when temperature in a space is to reach a higher energy use level (comfort level) as an occupancy time and the temperature selected for that interval of occupancy as the occupancy temperature. Note that this definition also includes the higher temperature which is typically selected during a heating phase of space temperature control and which follows a nighttime setback interval even though, in a strict sense, the space has never been unoccupied. The time interval during which the space temperature returns to the occupancy temperature from a temperature which requires less energy to maintain is referred to as the recovery interval, and the time of day at which the recovery interval begins is the recovery start time. The time at which the space temperature reaches the occupancy temperature is the actual recovery time. Since there is typically a temperature range centered on the occupancy temperature, or any other set point temperature for that matter, actual recovery time will be considered in the following discussion to have been reached when the space temperature first enters this temperature range.

The length of the recovery interval depends on the thermal load to which the space is subjected for two different and distinct reasons. If in heating mode, for example, lower ambient temperature will require a longer recovery interval, i.e., the space will take longer to warm-up to the occupancy temperature, because the thermal load on the space is high. If the ambient temperature is low and the setback period is long, the space temperature will reach the setback temperature, further increasing the recovery time. On the other hand, a higher ambient temperature may provide a sufficiently reduced thermal load that the space does not reach its setback temperature and hence the difference between the space temperature at the time the recovery interval begins and the occupancy temperature is small, and the space temperature increases rapidly as well because there is a smaller thermal load for the furnace to overcome. The analysis is similar for air conditioning setback to a higher temperature and then a subsequent recovery interval to the lower occupancy temperature. The invention to be described is equally applicable to heating and to cooling, but for convenience, the description will mainly address a heating situation and this should be assumed unless otherwise stated.

Typically, the programming of the setback and recovery times and temperatures is done to a thermostat physically located in the controlled space. The most modern of these thermostats include a small microprocessor and a suitable display and control panel allowing an internal clock to be set and the desired time and temperature for each particular time period to be entered by the manager of the space. The thermostat to be described is controlled by the operation of a microprocessor type of digital processor.

It is desirable to start each recovery interval at a time which will place space temperature at the occupancy temperature very close to the occupancy time. After all, what is the purpose of accurately selecting setback and occupancy times if the associated occupancy temperatures are not achieved with reasonable accuracy? But this is not easy to do accurately, because there are a number of independent variables which are difficult to take into consideration when designing an inexpensive thermostat. For example, the rate at which individual heating units can heat a space is variable. As mentioned, the outdoor air temperature, solar radiation, internal loads, and wind can vary dramatically from one day to the next, further increasing the uncertainty about the thermal load on the space against which the heating unit must work. It is possible to include sensors which can to some extent measure these variations.

Accordingly, it would be advantageous to design a thermostat having a recovery method which is relatively sensitive to factors affecting recovery time and yet does not require expensive sensors to measure these factors. One approach used in the past was to record recent recovery times, and base the current prediction for the recovery time needed on recent recovery times. This approach reveals measuring the time for the space temperature to traverse some temperature range while the space temperature control unit is operating to determine a rate of temperature change, and then using this rate of change with an adjustment factor to determine the proper recovery start time. Alternately, another approach presents a process wherein the current space temperature is periodically measured and when it crosses a time-temperature line defined as the recovery ramp rate, and represented by a straight line, then recovery is started. However, the major shortcomings of these approaches are that they do not take into consideration the variable rate at which a space can be heated or cooled. Additionally, these approaches do not include means to account for the outdoor air temperature, solar radiation, internal loads, and wind, which as previously mentioned, can vary dramatically from one day to the next. The lack of an accounting for such parameters, which indeed affect the recovery rate, further increases the uncertainty about the thermal load of the space

SUMMARY OF THE INVENTION

In a first embodiment of the present invention, an outdoor air temperature sensor is used in a thermostat to more accurately determine the straight line temperature recovery ramp rate at which a space returns to its occupancy temperature (recovery rate or ramp rate hereafter) from its current temperature (CT) and thus provides for an accurate selection of the time at which recovery should start. In this scheme, the CT is periodically measured and when the CT crosses the time-temperature line defined by the ramp rate, then recovery is started. This invention employs regular calculations of the time required to recover to the next occupancy temperature (OTE) from the current space temperature as prescribed by the equations presented herein. When the difference between the present time and the next occupancy time becomes less than the time which the ramp recovery approximation predicts will be needed to return to the occupancy temperature at the desired occupancy time, then recovery starts. In a second embodiment of the present invention, the recovery rate is approximated by a straight line which is then used to predict the time required to recover to the next occupancy temperature.

The use of a ramp-based determination of the proper recovery start time takes into account the current temperature of the space, the current outdoor air temperature, the recovery rate during the previous recovery period, and the thermal time constants. For example, in some circumstances, the space may cool only a few degrees during a setback interval. In this case, the ramp will be crossed by the CT relatively late in the setback period, because the space need only be warmed a few degrees. If the slope of the ramp has been chosen with reasonable accuracy, only an increased thermal load can make the predicted recovery time too short. But fortunately, a too short recovery time is only briefly inconvenient or uncomfortable rather than injurious. Decreases in the assumed thermal load may result in a predicted recovery time which is too long. This situation simply reduces slightly the energy savings realized in controlling setback of the space temperature. In an improvement to this approach, the ramp rate or recovery rate is updated based on the error in time at which recovery has been completed in previous setback intervals.

For the present invention, the equations used for adaptively optimizing the recovery ramp rate, and hence the recovery start time, as a function of the current space temperature (CT), the current outdoor air temperature (OAT or $T_{oa}$ at time t which is at the current moment), recovery ramp rate from the previous recovery period $(RR)_1$, and the thermal time constants, $\tau_1$ and $\tau_2$, respectively, for the previous and present recovery periods, are based on the following considerations. What follows is a mathematical derivation of optimizing the temperature recovery ramp rate as a function of the measured ambient air temperature, the sensed space temperature, and the ramp rate computed on the previous day for the similar recovery period (AM or PM).

An energy balance on a thermal system, for example, a residential building, results in the following equation for the time rate of change of the sensed space temperature $$mc_p \frac{dT_s}{dt} = -UA[T_s - T_{oa}] \quad (1)$$

or, $$\frac{mc_p}{UA} = -\frac{T_s - T_{oa}}{dT_s/dt} \quad (2)$$

where, $mc_p$=Overall thermal capacity of the space, $T_s$=Sensed space temperature at time t, UA=Overall heat transfer coefficient of the system, and $T_{oa}$=Outdoor ambient air temperature at time t.

In Equation (2), the ratio of the overall thermal capacity of the space, $mc_p$, to the overall heat transfer coefficient of the system, UA, is commonly known as the overall thermal time constant of the system, $\tau_s$, which is expressed as $$\tau_s = \frac{mc_p}{UA.} \quad (3)$$

Substituting Equation (3) into Equation (2), one gets $$\tau_s = \frac{T_s - T_{oa}}{dT_s/dt} \quad (4)$$

Those skilled in the art will note that once a thermal system has been defined, its thermal time constant, as defined by Equation (3), will not vary significantly on a daily basis specifically between two consecutive days in particular. However, it should be noted that since the thermal and heat transfer properties of any material could vary with its temperature, the thermal system's time constant during the low cold temperatures of the winter months could conceivably be different than that during the higher warmer temperatures of the summer months. Specifically, those skilled in the art will note that the heat transfer coefficient, UA, will be different during the winter months than during the summer months, and that it is also influenced by the wind speed, wind direction, and many other factors.

In the more general case, Equation (4) can be utilized as follows to determine $\tau_{s,N}$, the thermal time constant of the system on day N $$\tau_{s,N} = \frac{[T_s - T_{oa}]_N}{[dT_s/dt]_N} \quad (5)$$

where $[T_s - T_{oa}]_N$ is the average temperature difference between the current sensed space temperature and the outdoor air temperature during a time period when the space conditioning plant is "ON"; and $(dT_s/dt)_N$ is the time rate of change of the sensed space temperature during this same time period.

Equation (5) when used on any two days will provide the overall thermal time constants $\tau_{s,1}$ and $\tau_{a,2}$ for the first and second day, respectively. For this, the more general discussion, the "two days" do not have to be consecutive days. In fact these could be any two days with day 2 occurring after day 1. Thus, one has the equations $$\tau_{s,1} = \frac{[T_s - T_{oa}]_1}{[dT_s/dt]_1} \quad (6)$$

and $$\tau_{s,2} = \frac{[T_s - T_{oa}]_2}{[dT_s/dt]_2} \quad ; \quad (7)$$

where, the subscripts 1 and 2 refer to day 1 and day 2, respectively.

Now, any difference in the time constants between these two days can be expressed as a ratio of the two overall thermal time constants $$\frac{\tau_{s,1}}{\tau_{s,2}} = \xi \quad (8)$$

Combining Equations (6), (7), and (8), one gets $$\xi = \frac{\tau_{s,1}}{\tau_{s,2}} = \frac{[T_s - T_{oa}]_1/[dT_s/dt]_1}{[T_s - T_{oa}]_2/[dT_s/dt]_2} \quad (9)$$

or, $$\left[\frac{[dT_s]}{[dt]}\right]_2 = \xi \frac{[T_s - T_{oa}]_2}{[T_s - T_{oa}]_1}\left[\frac{[dT_s]}{[dt]}\right]_1. \quad (10)$$

The general Equation (10) provides a method to adaptively optimize the temperature recovery ramp rate by accounting for varying ambient air temperatures between two days and by also taking into consideration any differences in the overall thermal time constant of the system between those same two days. The two days under consideration may or may not be consecutive days. In the more special case, if it is assumed that the overall time constant of the system does not vary between the two days under consideration, i.e., $\xi=1.0$, then Equation (10) can be written as $$\left[\frac{[dT_s]}{[dt]}\right]_2 = \frac{[T_s - T_{oa}]_2}{[T_s - T_{oa}]_1}\left[\frac{[dT_s]}{[dt]}\right]_1. \quad (11)$$

Note that Equation (8) also provides an ability to monitor the integrity of the thermal system, in this case a residential building, between two periods. Thus, Equation (8) can be used for system (i.e., building) diagnostics purposes. Any degradation in the thermal performance of the system will be reflected in the value of ξ. For example, if the thermal resistance of a building has degraded due to moisture condensation in the building's insulation (for instance, a wall, ceiling, etc.), then the value of ξ will change to reflect this change in the building's thermal integrity. Furthermore, a dramatic change in ambient factors such as wind speed and/or outdoor air temperature and/or solar energy incident on the exterior and/or interior component(s) of the structure will also effect the value of ξ. Many other examples and applications such as this can be documented.

A setback thermostat which adjusts the start of recovery by using an assumed or predicted rate of cooling or heating during a recovery interval from an energy saving temperature, includes a temperature sensor providing a signal indicative of the current space temperature CT, a temperature sensor providing a signal indicative of the current outdoor air temperature (OAT) and a programmable digital processor including a plurality of internal operand memory locations. At least one of these operand memory locations contains an occupancy time value which is a time of day and an associated occupancy temperature value and another which contains a ramp rate value. The processor also includes input channels receiving the temperature sensor signals, and an output channel providing an operation signal to start operation of a space temperature control unit (which includes a heater or a cooler) responsive to a predetermined internal condition of the processor. The processor periodically converts the temperature sensor signals to digital current temperature values and stores the current temperature values in internal operand memory locations. The processor further includes a clock maintaining in an internal operand memory location a present time value specifying the present time of day. The processor also includes an instruction memory from which may be retrieved instructions for execution by the processor and in which is stored a sequence of instructions whose execution commences with a recovery instruction and which when executed commencing with the recovery instruction causes the processor to comprise the following means which implement the invention within the thermostat.

Temperature difference means retrieve from their respective operand memory locations the space temperature and the ambient air temperature, generate a temperature difference value equal to the difference between the space temperature and the ambient air temperature, and store the temperature difference value in an operand memory location.

Means to estimate the time rate of change in space temperature during a plant "ON" cycle retrieve from their respective operand memory locations the space temperature values at the beginning and at the end of the plant "ON" period, compute the difference between these two temperature values, and then divide the temperature difference value by the corresponding duration of the plant "ON" cycle to yield the time rate of change in space temperature and store the time rate of change in space temperature in an operand memory location.

Thermal time constant determination means retrieve from their respective operand memory locations the difference between the space temperature and the ambient air temperature and the time rate of change in space temperature, divide the temperature difference value by the time rate of change in space temperature to yield the thermal time constant and store the thermal time constant in an operand memory location.

Means to determine the recovery ramp rate for the current recovery period retrieve from their respective operand memory locations the temperature recovery ramp rate for the previous similar (AM or PM) recovery period, the temperature difference between the space temperature and the ambient air temperature at the start of the current recovery period, the temperature difference between the space temperature and the ambient air temperature at the start of the previous similar (AM or PM) recovery period, the thermal time constant for the current recovery period and the thermal time constant for the previous similar (AM or PM) recovery period, means to compute the ratio of temperature differences as the ratio of the temperature difference between the space temperature and the ambient air temperature at the start of the current recovery period to the temperature difference between the space temperature and the ambient air temperature at the start of the previous similar (AM or PM) recovery period, means to compute the ratio of thermal time constants as the ratio of the thermal time constant for the previous similar (AM or PM) recovery period to the thermal time constant for the current recovery period, and means to compute the product of the temperature recovery ramp rate for the previous similar (AM or PM) recovery period and the ratio of temperature differences and the ratio of thermal time constants, and store the product as the recovery ramp rate for the current recovery period and store the recovery ramp rate for the current recovery period in an operand memory location.

Time difference means retrieve the next occupancy time value and the present time value from their respective operand memory locations, generate a time difference value equal to the difference between the next occupancy time and the present time and store the time difference value in an operand memory location.

Ramp delta means retrieve from their respective operand memory locations the time difference value and the ramp rate value, generate a ramp delta value equal to the product of the time difference value and the ramp rate value, and store the ramp delta value in an operand memory location.

Lastly, ramp set point means retrieve the next occupancy temperature value and the ramp delta value from their respective operand memory locations, form a ramp set point value equal to at least one of i) the difference between the next set point temperature value and ramp delta value and ii) the sum of the next set point temperature value and ramp delta value, and compare the ramp set point value with the current temperature value. The predetermined internal processor condition comprises a predetermined magnitude relationship between the ramp set point value and the current temperature value, and when the predetermined internal processor condition exists, the processor issues the recovery signal. Which of the two ramp set point values are used depends on whether a heating or cooling recovery is scheduled.

An important feature of the first embodiment of this invention is a way to adaptively optimize the recovery ramp rate value based on the difference between the space temperature and the outdoor air temperature at the start of the recovery period, the thermal time constant value at the start of the recovery period, the thermal time constant value for the previous similar (AM or PM) recovery period, and the recovery ramp rate experienced during the previous similar (AM or PM) recovery period.

An important feature of the second embodiment of this invention is the determination of the experienced recovery ramp rate as the ratio of the difference between the space temperatures at the start and at the end of the recovery period to the time duration of the recovery period, i.e., the time rate of change of the space temperature during the recovery period and storing the ramp rate value in the data cell storing the ramp rate value.

An important feature of the third embodiment of this invention is a way to update the ramp rate value depending on the accuracy with which previous recoveries have occurred. This correction is implemented within the thermostat's processor as miss time recording means receiving the next set point time value and the present time value and whenever the predetermined internal processor condition first occurs, storing in an operand memory location the difference between the occupancy time value and the present time value as a miss time value; and ramp rate value update means receiving the miss time value and the ramp rate value from their respective operand memory locations, for computing an updated ramp rate value equal to the ramp rate value plus the product of the miss time value and a fractional value, and for storing the updated ramp rate value in the data cell storing the ramp rate value. An important feature of this invention is the process of adaptively modifying the recovery ramp rate experienced during the previous similar (AM or PM) recovery period so as to minimize the miss time.

This invention involves the operating of an electronic processor of some kind. Typically, this processor may be a programmable microprocessor with the method steps implemented by the instructions of the program. But it is also possible to have a dedicated integrated circuit in which the processor comprises individual circuit elements which perform the steps of the invention. In such a processor-implemented method for controlling setback temperature operation of a thermostat, the processor includes an operand memory and an output channel providing an operation signal for initiating operation of a space temperature control unit such as an air conditioner or a furnace.

Such a method comprises the steps of: a) recording in the operand memory each current value of the space temperature and current value of the outdoor air temperature; b) recording in the operand memory, at least one occupancy temperature and one occupancy time which follows a setback temperature interval; c) recording in the operand memory the present time of day; d) recording in the operand memory a ramp rate value; e) recording in the operand memory each of the thermal time constant values for the current recovery period, the previous similar (AM or PM) recovery period, and during a plant "ON" period; f) recording in the operand memory the differences between the space temperature and the outdoor air temperature; g) recording in operand memory the time rate of change of the space temperature during a plant "ON" cycle; h) recording in operand memory the time rate of change of the space temperature during each recovery period for the day; i) calculating an updated recovery ramp rate value equal to the product of the temperature recovery ramp rate for the previous similar (AM or PM) recovery period and the ratio of the temperature difference between the space temperature and the ambient air temperature at the start of the current recovery period to the temperature difference between the space temperature and the ambient air temperature at the start of the previous similar (AM or PM) recovery period and the ratio of the thermal time constant for the previous similar (AM or PM) recovery period to the thermal time constant for the current recovery period, and storing the product as the recovery ramp rate for the current recovery period in an operand memory location; j) at the end of intervals of predetermined length, calculating a time difference value equal to the difference between the occupancy time and the present time and recording the time difference value in the operand memory; k) after a time difference value has been recorded, calculating and recording in the operand memory a ramp delta value equal to the product of the latest time difference value recorded and the ramp rate value; l) calculating and recording in the operand memory a ramp set point value equal to at least one of the differences between the occupancy temperature value and the ramp delta value and the sum of the occupancy temperature value and the ramp delta value; and m) comparing the ramp set point value with the current temperature value, and when a selectable relationship between the ramp set point value and the current temperature value exists, issuing the operation signal.

It is also strongly preferred to update the ramp rate value as explained in connection with the apparatus version of the invention described briefly above.

DESCRIPTION OF THE EMBODIMENTS

Figure 1:
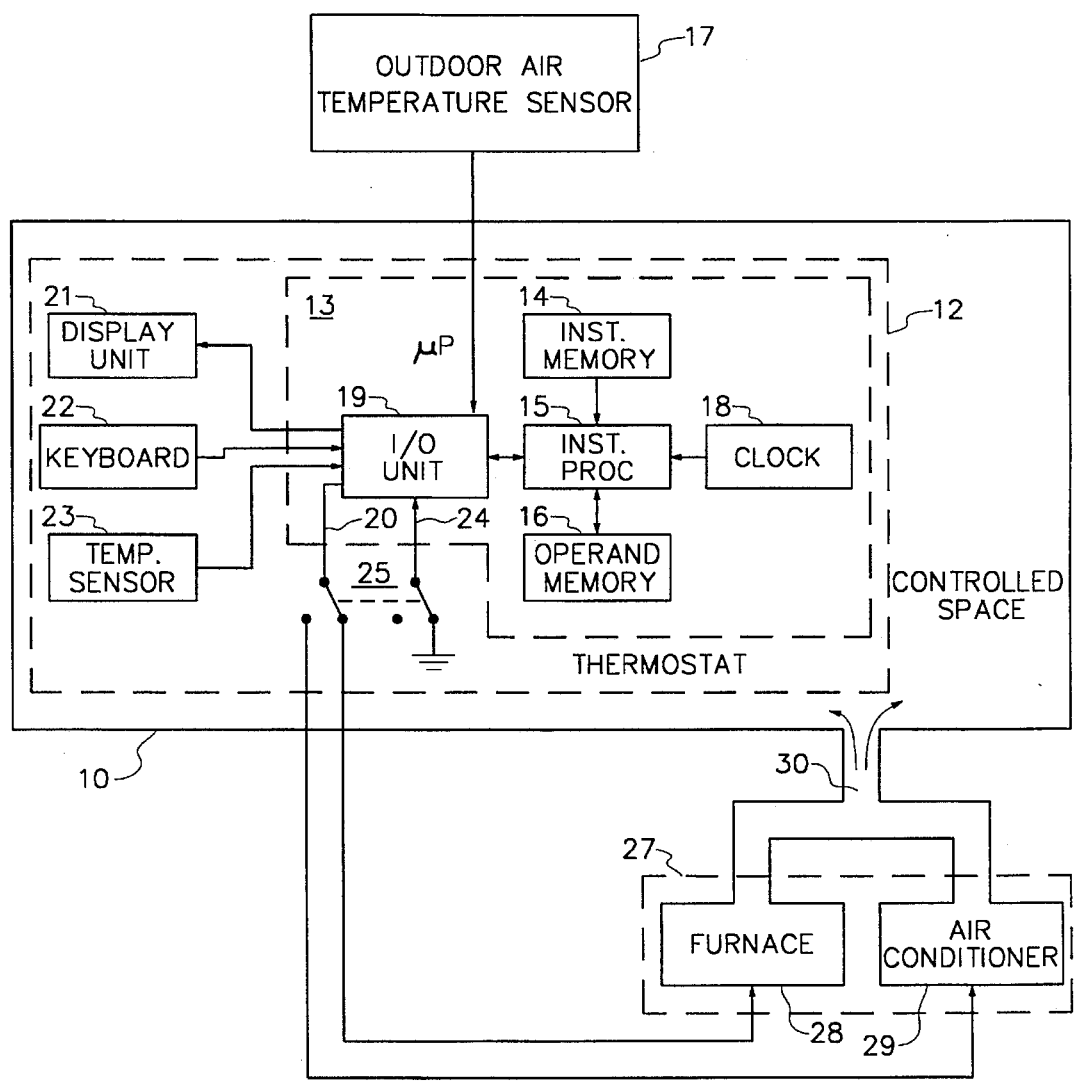
FIG. 1 is a block diagram of a thermostat mounted in a space for controlling the temperature of that space according to the teachings of the invention.

In FIG. 1, an entire space temperature control system is shown as including a controlled space 10 in which is mounted a thermostat 12 shown in block diagram form. Thermostat 12 controls the operation of a furnace 28 and an air conditioner 29 which together comprise a space temperature control unit 27 for providing heated or cooled air through duct 30 to controlled space 10.

Operation of thermostat 12 is controlled by a microprocessor 13 which includes an instruction processor 15 for executing instructions stored permanently as a program in an instruction memory 14 and provided as requested by processor 15. The results of arithmetic and logical operations by instruction processor 15 are stored in an operand memory 16 and then retrieved as later required by execution of the instructions in the program. The various arithmetic registers used by instruction processor 15 are part of operand memory 16. A clock module 18 provides interrupts to the execution of instructions by processor 15 at predetermined intervals, for example, every second. Each interrupt causes execution of instructions which increment the contents of a clock location within operand memory 16. By properly setting a value representative of the present time of day into the clock location, a present time of day value will be continually available within microprocessor 13. This can be done by the user manipulating the keyboard properly. The present time is constantly available to microprocessor 13 so as to determine times at which recovery intervals should be started. Microprocessor 13 further includes an input/output (I/O) unit 19 by which the microprocessor 13 can communicate with external (to the microprocessor) data source and destination elements through input and output channels of I/O unit 19.

In thermostat 12, these external elements include an outdoor air temperature sensor 17, a space temperature sensor 23, a keyboard 22 and a display unit 21. Temperature sensors 17 and 23 provide on input channels, signals to I/O unit 19 indicating the current temperature of the outside ambient air and the current temperature of the air in the controlled space, respectively. At regular intervals, instruction processor 15 executes instructions which store the current temperature values from sensors 17 and 23 in appropriate locations of operand memory 16, converting the sensor signals from analog to digital data if necessary.

Keyboard 22 provides on an input channel, input data to I/O unit 19 for selecting occupancy temperature set points and times desired by the occupants, as well as for setting necessary initial conditions of thermostat 12. Display unit 21 displays information received via an output channel about the thermostat 12 operation. Such information includes the present time of day, present day of week, current temperature, current heating or cooling phase, and information entered via keyboard 22 for setting the setback and occupancy times (OTI) and temperatures (OTE). In particular, this invention involves microprocessor 13 in selecting the proper recovery start time (RST) at which time is issued an operation signal on path 20 to begin recovery to an occupancy temperature. This recovery start time will always fall during a setback interval when the space temperature is being held at a relatively low energy consumption level, lower in the heating mode, and higher in the cooling mode. By starting the return to the occupancy temperature during the setback interval, the space temperature will reach the occupancy temperature nearer to the specified occupancy time. This recovery start time is dependent on both occupancy temperature and occupancy time (such as AM or PM). Therefore, there is provision to allow loading desired occupancy times and the associated occupancy temperature for each from the keyboard 22 into locations within operand memory 16. It may be assumed that there is at least one OTI and its associated OTE within operand memory 16.

Operand memory 16 also has in one location a ramp rate (RR) value which is initially preset to a default value. In the first embodiment, this default value is 7.5° F./hr. The ramp rate value is the current estimated average rate at which unit 27 can return the space temperature to the OTE value. One says "estimated", because the actual ramp rate varies with time and conditions in a very non-linear and unpredictable manner. A feature of this invention is the ability to change the ramp rate based on previous performance of the method in selecting RST, and to thereby both improve the future accuracy in selecting RST and change the method as the seasons change. Another feature of this invention is the ability to adaptively optimize the recovery ramp rate in response to changing conditions such as outside air temperature, solar and/or internal load, wind speed and direction, etc., which affect the thermal load and the thermal time constant of the space and the system.

An operation signal is provided from I/O unit 19 by an output channel to path 20 and, when present, signifies to control unit 27 that activity by either furnace 28 or air conditioner 29 is required. Which of these devices is to be active is selected by a two gang double throw mode switch 25 shown in FIG. 1, which is in the heating position. When switch 25 is thrown to the alternate position, path 20 is connected to the path carrying the operation signal to air conditioning unit 29. The second gang of switch 25 provides a mode signal to I/O unit 19 on path 24 by which the desired mode of operation of thermostat 12 can be communicated to microprocessor 13. In the simplified design shown in FIG. 1, path 24 is grounded when in the heating mode, and open when in cooling mode.

Execution of the program in instruction memory 14 by instruction processor 15 controls the entire operation of thermostat 12. It should be understood that the program contained in memory 14 has a physical form in that when it is recorded, it forms actual physical features within memory 14 which can be detected and distinguished as encoding the particular digital format of the program. As the program instructions are executed, microprocessor 13 is in effect caused to sequentially become a number of different means, each of these means existing during the time that the related instructions are being executed. Certain of these means are the elements of the invention. Further, the invention can also be defined in terms of process steps which have the ultimate aim of controlling operation of control unit 27 in a more advantageous way. From this standpoint, each of these process steps are intended to affect the physical structure of microprocessor 13 or other device in which these steps are implemented. It is of course well known to those familiar with microprocessor technology that each of the method steps by which a process such as this invention may be alternatively defined, cause detectable physical changes within operand memory 16.

Figure 4A:
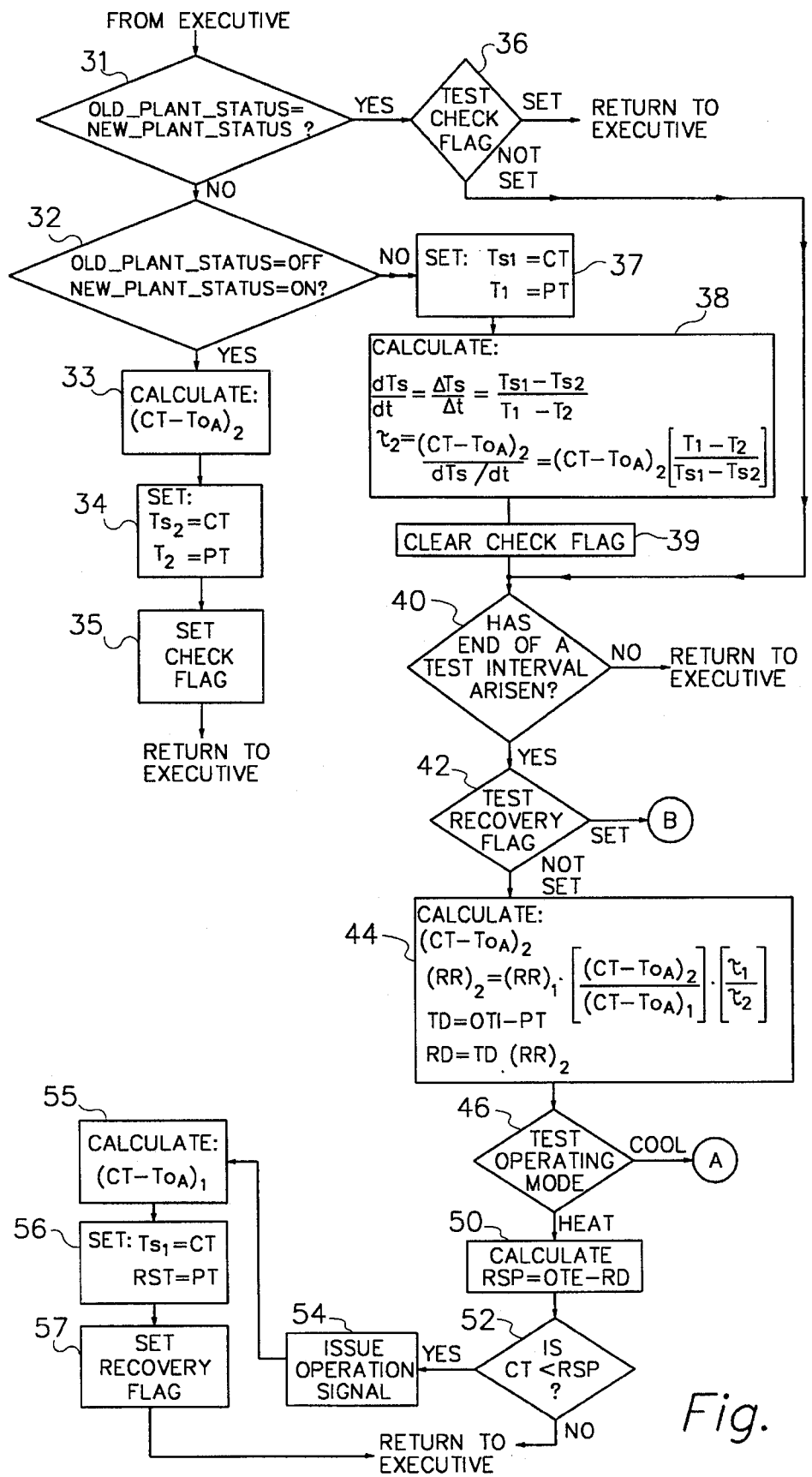
FIGS. 4A, 4B and 4C reveal a logic flow chart for an instruction sequence of a first embodiment of this invention which when executed in the appropriate microprocessor within a thermostat will cause that microprocessor and thermostat to constitute the invention.
Figure 4B:
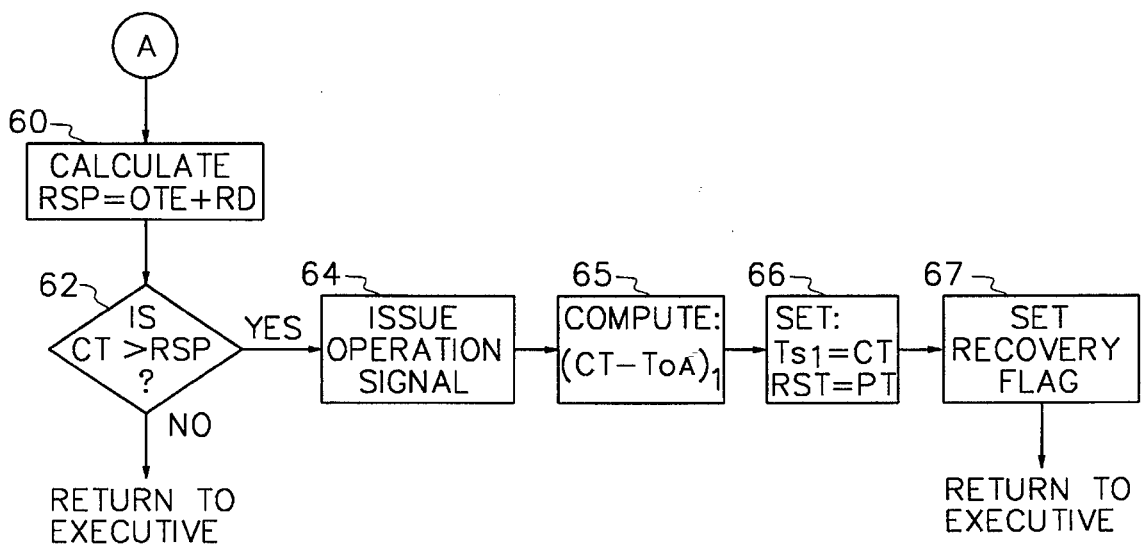
Figure 4C:
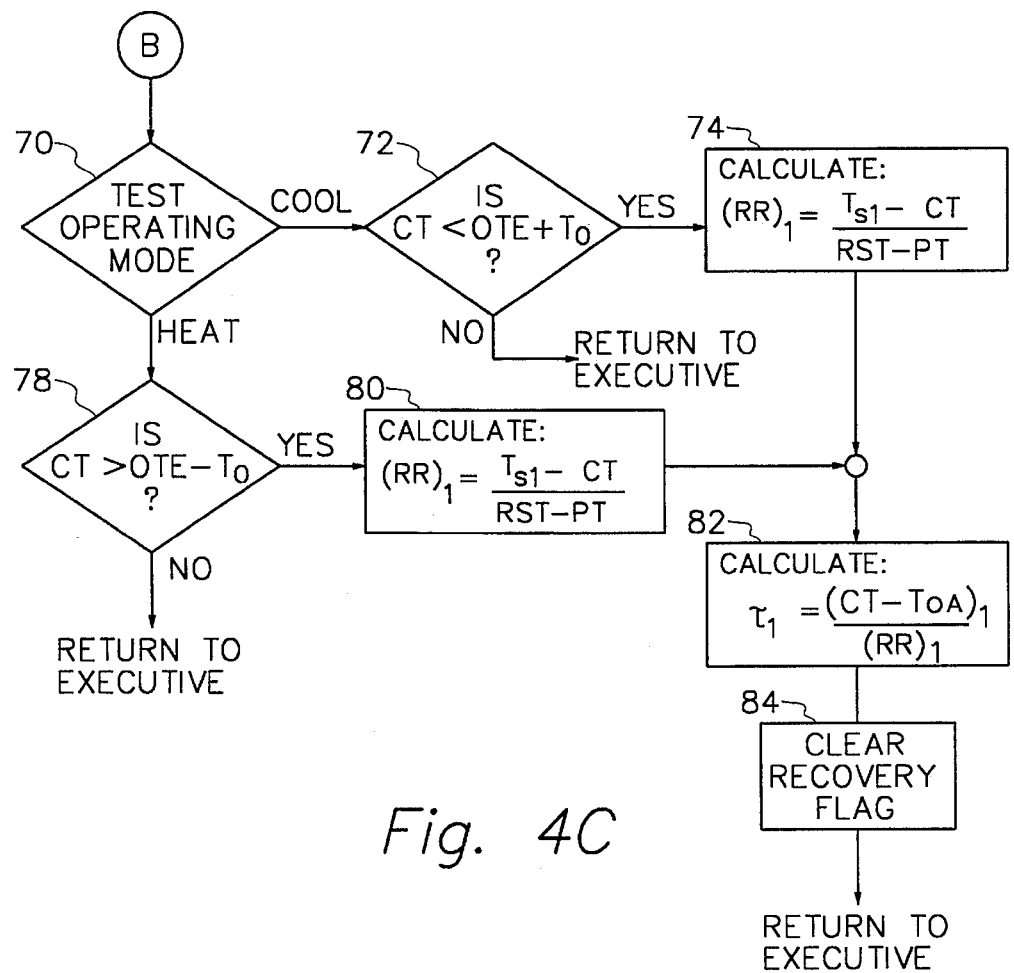
Figure 4D:
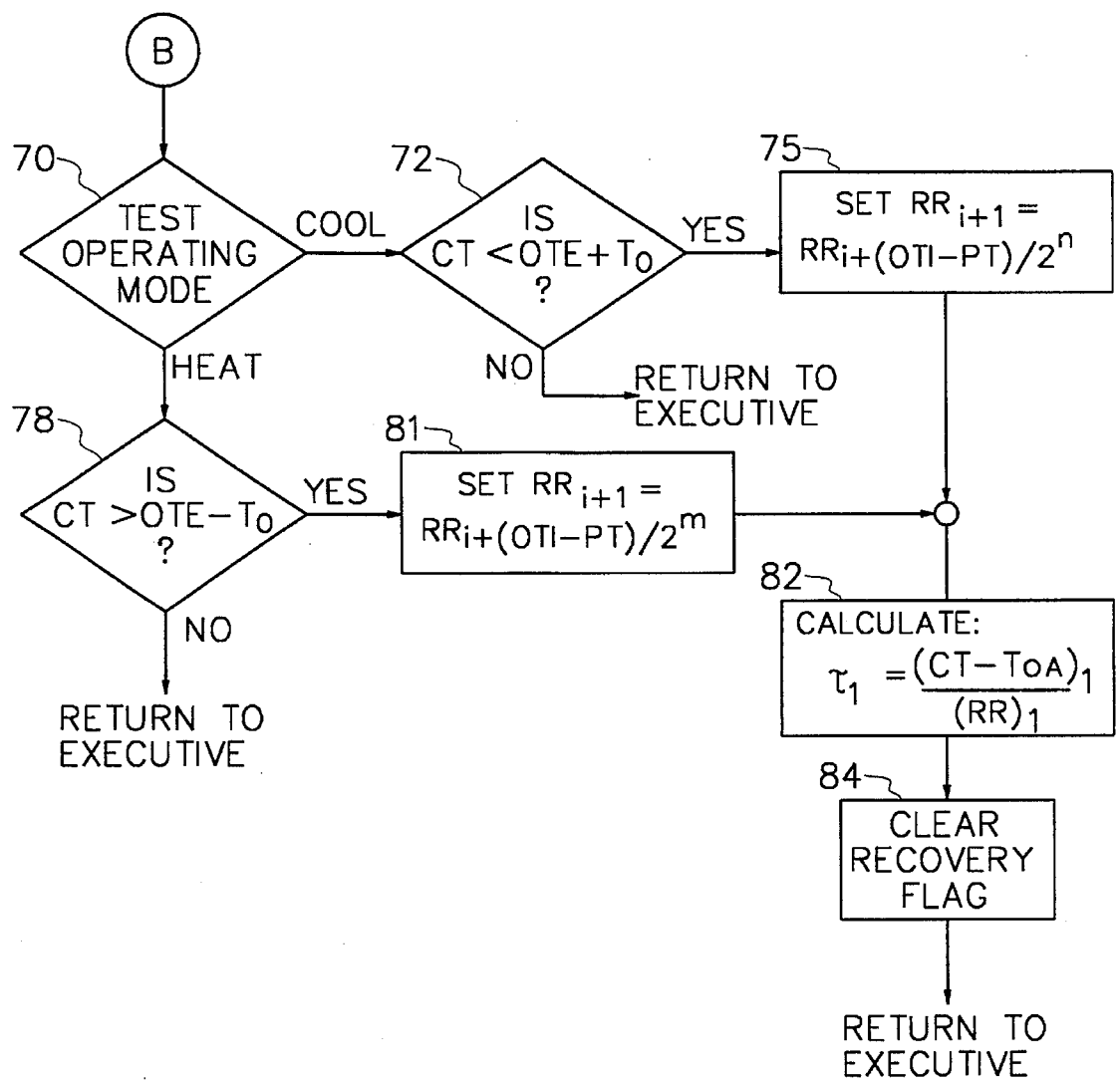
FIG. 4D is a logic flow chart for an instruction sequence to be used in place of FIG. 4C and showing a second embodiment of this invention.

The program permanently stored within instruction memory 14 can be represented as a flow chart, and FIGS. 4A, 4B, and 4C are the portion of that flow chart pertaining to the first embodiment of the invention, and FIGS. 4A, 4B, and 4D constitute the portion of the flow chart pertaining to the second embodiment of the invention. It is assumed that the flow chart has an executive portion by which various functions of microprocessor 13 are scheduled. The instructions which implement the invention are executed by processor 15 at regularly scheduled predetermined test intervals, 10 minutes to be exact, in the embodiments of this invention. For convenience, a legend is listed below for the Figures, which identifies the various abbreviations of the arithmetic values employed in implementing the invention to achieve accurate RSTs. The portion of the flow chart shown in FIGS. 4A, 4B, 4C, and 4D has a single step from that executive routine shown as decision element 31. The terms of the legend are wherein OTI is occupancy time, OTE is occupancy temperature, PT is present time of day, ART is actual recovery time, CT is current temperature, TD is time difference, RD is ramp delta, RSP is ramp set point, $RR_i$ is old ramp rate, $RR_{i+i}$ is new ramp rate, m,n are positive integers, To is control band offset, RST is recovery start time, $T_{s,1}$ is sensed space temperature at event one, $T_{s,2}$ is sensed space temperature at event two, $T_{oa}$ is outdoor air temperature, $(RR)_2$ is optimized (revised/updated) recovery ramp rate for the present AM or PM recovery period, and $(RR)_1$ is actual or estimated recovery ramp rate from the previous AM or PM recovery period corresponding to the present AM or PM recovery period (i.e., corresponding to $(RR)_2$).

There is one more concept which should be briefly discussed before explaining the operation of FIGS. 4A, 4B, 4C, and 4D. One can consider the time between a setback time and the specified OTI as having two distinct periods. There is the initial low energy period when CT is controlled to the temperature requiring less energy. This is followed by the recovery period where control unit 27 brings the controlled space back to the OTI. In the method explained in connection with the flow chart of FIGS. 4A and 4B, there is a recovery flag set by instructions in the program at the start of the recovery period and cleared when recovery has been completed. It is assumed that the recovery flag has been initialized to its cleared condition at the start of each setback period. In the method explained in connection with the flow chart of FIG. 4A, there is a check flag set by instructions in the program at the start of a plant "ON" cycle and cleared when the plant is turned "OFF". It is assumed that the check flag has been initialized to its cleared condition at the start of each plant "ON" period.

Figure 2:
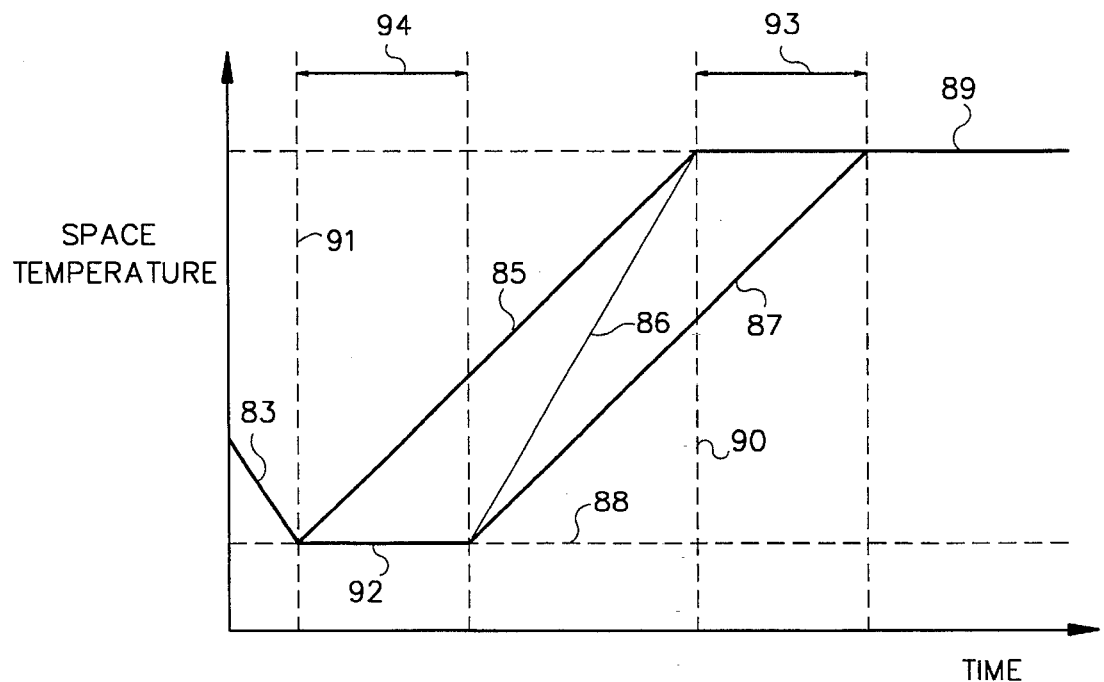
FIGS. 2 and 3 are graphs revealing recovery ramp rates for warmer and colder previous days, respectively, of the related art and the present invention.

FIG. 2 shows space temperature versus time of thermostat 12 of the present invention in a heating mode, wherein the present day is colder than a previous day. Temperature level 88 is the setback setpoint temperature. Line 83 is the fall of temperature with respect to time. Line 85 is $(dT_s/dt)_2$ from equation (10). Time 91 is the step of change in control setpoint temperature from the setback value to the comfort value. Dark line 92 is the space temperature if one is using a related art approach where the setpoint temperature is maintained longer than it should be on a pending colder day. Line 87 is the expected space temperature recovery rate as in the related art. Line 90 is the programmed changeover or occupancy time. Line 89 is the comfort setpoint or occupancy temperature. Line 86 is the ramp rate $(dT_s/dt)_1$ as in the related art, based on a previous recovery if there is no adaptation according to the present invention. Time duration 93 is late recovery if using related art when the previous day was warmer than the present day. Time duration 94 shows an earlier time by which recovery is initiated earlier to achieve the comfort set point temperature by time 90 as the change of a colder day is anticipated by the present invention per equation (10).

Figure 3:
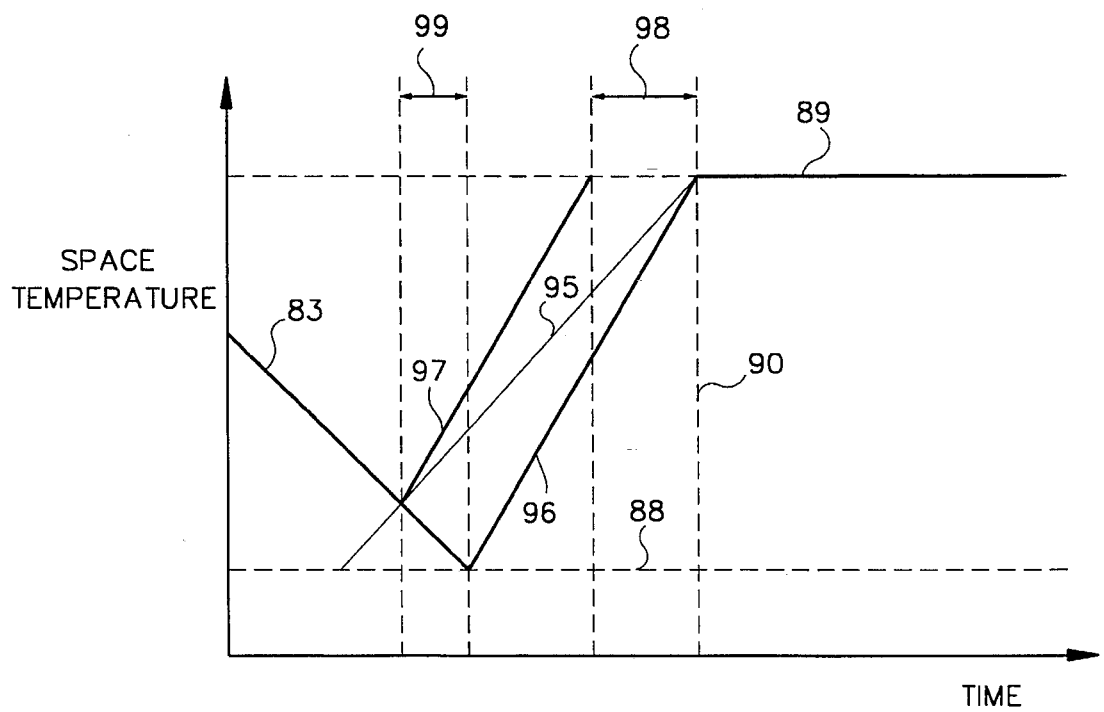

FIG. 3 shows space temperature versus time of thermostat 12 of the present invention in a heating mode wherein the present day is warmer than a previous day. Temperature level 88 is the setback setpoint temperature and line 89 indicates the comfort setpoint or occupancy temperature. Line 83 shows the fall of the space temperature when the plant or furnace is off. Line 95 is the ramp rate $(dT_s/dt)_1$ as in the related art, based on a previous recovery if there is no optimization in accordance with the present invention. Line 90 is the programmed changeover or occupancy time when the comfort temperature level is to be attained. Line 96 is the ramp rate $(dT_s/dt)_2$ from equation (10) of the present invention taking into consideration that the present day is warmer than a previous day. Line 97 is the expected space temperature recovery rate as in the related art. Time period 98 is the duration of the early recovery if using the related art approach when the previous day was colder than the present day. Time period 99 is the duration by which recovery is delayed by using the present invention in view of equation (10) wherein the present day is warmer than the previous day.

In FIG. 4A, decision block 31 compares the current plant status to the status of the plant during the most previous pass through. If the plant status has changed, then decision block 32 is executed to check whether the plant status has changed from "OFF" during the previous pass to "ON". If the plant has just been turned "ON", then the difference between the current space temperature and the outdoor air temperature is calculated in arithmetic element 33 and stored in operand memory 16. Next, element 34 stores in operand memory 16 locations both the current space temperature and the present time of day. The check flag is set by element 35 and program flow control is returned to the executive. If decision block 31 indicates that the plant status has not changed (that is, the new plant status is the same as the old plant status) since the previous pass, then the status of the check flag is checked by decision block 36. If the check flag is set, then program flow control is returned to the executive. If the check flag is not set, then program flow control is diverted to decision block 40. If the answer from decision block 32 is no, then element 37 stores in operand memory 16 locations both the current space temperature and the present time of day. Arithmetic element 38 calculates and stores in operand memory 16 the time rate of change of the space temperature during the most recently completed plant "ON" cycle, and also calculates and stores in operand memory 16 the system's thermal time constant during this same "ON" cycle. The time rate of change of the space temperature is represented by a slope of a straight line plot of temperature versus time. Mathematically, this is the ratio of the difference in space temperature at the start and at the end of the most recent plant "ON" period to the time duration of this "ON" period. The applicable equation is shown in block 38 of FIG. 4A. Element 38 also calculates the thermal time constant of the system as the ratio of the temperature difference from block 33 to the just computed value of the time rate of change of the space temperature. The check flag is then cleared in element 39.

If the current test interval, as set by the executive, has not elapsed, then control is returned to the executive from block 40 as shown by the flow path labeled NO. When the test interval is over, then execution of the instructions comprising decision element 40 cause instruction execution to follow the path labeled YES to a second decision element 42 whose instructions test the condition of the recovery flag. If the recovery flag is set, instruction execution follows along the branch labeled SET and starts with the instruction sequence at the B connector either in FIG. 4C of the first embodiment or in FIG. 4D of the second embodiment. If the recovery flag is not set, execution continues along the NOT SET branch to arithmetic element 44, which begins the method to determine the RST. The instructions of element 44 first calculate and store in operand memory 16 the difference between the current space temperature (CT) and the ambient air temperature $(T_{oa})$. Element 44 then calculates and stores in operand memory 16 the recovery ramp rate that should be used for the upcoming recovery period, $(RR)_2$. The applicable equation is shown in block 44 of FIG. 4A. The time difference TD=OTI−PT, where PT is the present time and OTI is occupancy time, is also calculated and stored in an operand memory 16 location. Element 44 instructions then calculate a ramp delta value RD=TD× $(RR)_2$ and stores RD in an operand memory 16 location. The instructions represented by decision element 46 test the mode signal on path 24 of FIG. 1 to determine whether thermostat operation is in heating or cooling mode. If in cooling mode, instruction execution follows the path of connector A to FIG. 4B. If in heating mode, then the instructions of arithmetic element 50 are executed to determine a ramp set point value RSP=OTE−RD.

The instructions of decision element 52 are then executed to make the comparison: current space temperature CT<RSP. If true, then the instructions of element 54 are executed to cause an operation signal to be placed on path 20. With mode switch 25 connecting path 20 to furnace 28, the operation signal causes furnace 28 to operate and begin warming controlled space 10. The instructions of element 55 then calculate and store in operand memory 16 the difference between the current space temperature and the outdoor air temperature. Both the current space temperature and the present time of day (i.e., the recovery start time) are stored in operand memory 16 by the instructions of element 56. The instructions of element 57 then follow to set the recovery flag. The program logic flow is then returned to the executive.

The portion of the program instructions executed when thermostat 12 is in cooling mode to start recovery is represented by the flow chart elements of FIG. 4B which start with connector A. When the decision element 46 test detects cooling mode, then the instructions of element 60 are next executed to perform a calculation similar to that of element 50, but in the case of element 60, RSP=OTE+RD. Decision element 62 returns execution to the executive if CT>RSP is not true, and to the instruction of element 64 if true. The operation signal generated by the instructions of element 64 is carried through switch 25 to the air conditioner unit 29, which begins to cool controlled space 10. The arithmetic element 65 calculates the difference between the current space temperature and the outdoor air temperature, and stores it in operand memory 16. Both the current space temperature and the present time of day (i.e., the recovery start time) are stored in operand memory 16 by the instructions of block 66. The instructions of element 67 set the recovery flag, and execution then returns to the executive routine. This completes the instruction execution activities related to starting recovery.

An important feature of this invention is the ability to update the ramp rate (RR) to correct for inaccurate selection of the RST and to account for any changes in the recovery ramp rate due to changes in the outdoor air temperature, internal and/or solar loads, wind speed and direction, and so forth. After the recovery flag has been set by the instructions of either element 57 or 67 and thus during recovery, the instructions of decision element 42 will transfer execution to the instructions starting at decision element 70. First the operating mode is tested and execution branches to either the instructions of decision element 72 (cooling condition) or element 78 (heat). It can be noted that as CT drops during a return to a lower OTE from a higher setback temperature during cooling, or as CT rises during a return to a higher OTE from a lower setback temperature during heating, the CT value will eventually reach a temperature near the OTE value at which recovery is deemed complete. In the heating situation, this value is OTE−$T_o$, where $T_o$ is a control band (which could resemble a kind of hysteresis) offset from the OTE. At this point, temperature control is returned to the temperature control method and continues in the customary fashion. Similarly, in the cooling situation, this value is OTE+To. In the first embodiment, $T_o$=1.5° F. When the tests of elements 72 and 78 show that CT has reached the offset range (which happens a single time for each recovery interval), the ramp rate is corrected either by executing the instructions of either element 74 or 80 of FIG. 4C in the case of the first embodiment of this invention, or by executing the instructions of either elements 75 or 81 of FIG. 4D in the case of the second embodiment of this invention.

In the first embodiment of this invention, element 80 (FIG. 4C) represents instructions which calculate an updated ramp rate, $(RR)_1$, in the heating situation, and then replace the value in the location in operand memory 16 in which $(RR)_1$ is stored with the new ramp rate value. Also, in the first embodiment of this invention, element 74 (FIG. 4C) represents instructions which calculate an updated ramp rate, $(RR)_1$, in the cooling situation, and then replace the value in the location in operand memory 16 in which $(RR)_1$ is stored with the new ramp rate value. Note that the instructions for both elements 74 and 80 in FIG. 4C are identical. Since the instructions of elements 74 and 80 are executed relatively quickly after the conditions of elements 72 and 78, respectively, are satisfied, the factor OTI−PT is the miss time, a value which is very close to the error in the most recent RST.

In the second embodiment of this inventions, element 81 (in FIG. 4D) represents instructions which calculate an updated ramp rate $RR_{i+1}=RR_i+(OTI-PT)/2^m$ in the heating situation, and then replace the value in the location in operand memory 16 in which $RR_i$ is stored with the new ramp rate $RR_{i+1}$. $RR_i$ is the ramp rate value used during the previous determination of the RST. Since the instructions of element 81 are executed relatively quickly after the condition of element 78 is satisfied, the factor OTI−PT is the miss time, a value which is very close to the error in the most recent RST, and may be either positive or negative. The expression $2^m$ is intended to imply that the miss time is multiplied by the inverse of two raised to a positive integer power. In the first embodiment, m=5, and $2^5$=32 for the specific situation where temperature is measured in degrees F. and time is measured for purposes of this method, in 10 minute increments. The value of the multiplier for the miss time is dependent on choice of these units, and should be chosen in the heating situation, regardless of the units involved, to correct the ramp rate sufficiently to make the miss time about 10% to 40% smaller if conditions do not change for the same recovery in the next day. An attempt to correct the ramp rate using a too large miss time multiplier can result in the method becoming unstable in selecting the RST. One can assume that a multiplier value in the approximate range of 1/15 to 1/60 is suitable for these units, so that m between 4 and 6 inclusive is preferred. For a ramp rate with units of degrees F./minute and one minute test intervals, the closest power of two corresponding to m=5 is m=12, and it is likely that m=11 and m=13 are also suitable. In the situation where ramp rate has units of degrees F./hour, m=0, i.e., $2^m$=1.

For the case of the second embodiment of this invention, choice of the miss time multiplier as a power of two is convenient for low end microprocessors used in thermostats because most of them do not have an arithmetic divide instruction, making the ease of dividing or multiplying by a power of two with a simple binary register shift attractive. It is possible that improvements in the power of low end microprocessors will provide bona fide divide instructions in them before too long, and it should be understood that the use of an integer power of two as the multiplier of the miss time in updating the ramp rate is strictly a matter of convenience for the second embodiment.

In the cooling case for element 75 (FIG. 4D) for the second embodiment of this invention, a calculation similar to that of element 81 is performed by which the ramp rate $(RR)_i$ is updated. However, it has been the applicant's experience that generally the multiplier of the miss time should be smaller in the cooling mode, so that n between 6 and 8 inclusive is the suitable range, with n=7 and $1/2^n$=1/128 as the value that is currently preferred. A smaller multiplier is preferred here because of the much smaller slope of the recovery rate when in cooling mode.

After the ramp rate has been updated, the actual thermal time constant $\tau_1$ during the "about to be completed recovery period" is calculated in element 82 as the ratio of the difference between the space temperature at the start of the recovery and the ambient air temperature also at the start of the recovery (either element 55 of FIG. 4A for the heating mode or element 65 of FIG. 4B for the cooling mode) to the ramp rate $(RR)_1$ for the about to be completed recovery period (from either element 74 of FIG. 4C (for cooling) or element 80 of FIG. 4C (for heating) for the first embodiment of this invention, or element 75 of FIG. 4D (for cooling) or element 81 of FIG. 4D (for heating) for the second embodiment of the present invention). The actual thermal time constant ($\tau_1$) is also stored in operand memory 16 by the instructions of element 82. Now the recovery procedure is complete, and the recovery flag is cleared by the instructions of element 84. Execution of the instructions of element 84 concludes the performance of the invention's method and instruction execution returns to the instructions comprising the executive portion of the program.

I claim:

1. A thermostat system in a space having a current space temperature that changes to an occupancy temperature is achieved at an occupancy time, the changing of the current space temperature caused by a heater or cooler, having a recovery start time that occurs at a recovery time prior to the occupancy time, the recovery time being a period of time needed for the current space temperature to be changed to the occupancy temperature, the recovery time determined by an optimized recovery ramp rate of a certain amount of space temperature change per unit time, comprising:

a first temperature sensor for sensing the current space temperature;

a second temperature sensor for sensing current outdoor ambient temperature of air external but proximate to the space;

a processor, connected to said first and second temperature sensors, having a memory, instruction processor and a clock;

a space temperature changing unit having a heater and a cooler; and a heat and cool mode selector connected to said processor and said space temperature changing unit; and wherein:

the recovery start time is at the beginning of a period of recovery time prior to the occupancy time when the current space temperature is to be approximately the same as the occupancy temperature, the recovery time being determined by a recovery ramp rate of a certain amount of temperature change per unit time; and the recovery ramp rate is based on (1) a difference between the current space temperature and the current outdoor ambient temperature at the recovery start time, (2) a thermal time constant based on a ratio of an average temperature difference between the current space temperature and the current outdoor ambient temperature during the recovery time when the space temperature is being changed to be approximately the same as the occupancy temperature, and of a time rate of change of the current space temperature during the recovery time, (3) a thermal time constant for a previous period of a recovery time having a similar time of day, and (4) a recovery ramp rate for the previous period of the recovery having the similar time of day.

2. The thermostat system of claim 1 wherein said processor can:

receive and store current space and outdoor ambient temperatures from said first and second temperature sensors, respectively;

send signals to said space temperature changing unit to effect or not to effect a change of current space temperature during a recovery time;

calculate and store recovery ramp rates and thermal time constants;

determine and initiate a recovery start time;

calculate and implement a recovery ramp rate; and determine a recovery start time such that the end of a recovery time closely coincides with the occupancy time when the current space temperature becomes approximately the same as the occupancy temperature.

3. A method for optimizing a temperature recovery ramp rate of a thermostat having current space temperature and outdoor temperature sensors, a processor, connected to the temperature sensors, for calculating and comparing information, for recording and accessing information to and from an operand memory connected to the processor, for noting time from a clock connected to the processor, and for issuing operation signals, in a space having a space temperature to be controlled relative to a set occupancy temperature and occupancy time, comprising:

recording by the processor in the operand memory, space temperatures and outdoor temperatures;

setting and recording in the operand memory, at least one occupancy temperature and one occupancy time which follows a setback temperature interval;

recording in the operand memory a present time of day;

calculating and recording in the operand memory a ramp rate;

calculating and recording in the operand memory thermal time constants of a current recovery period, and a previous similar (AM or PM) recovery period, during a plant "on" period wherein a plant is changing space temperature to approach occupancy temperature;

calculating and recording in the operand memory differences between space temperatures and corresponding outdoor air temperatures;

calculating and recording in the operand memory a time rate of change of the space temperature during the plant "on" period;

calculating and recording in the operand memory a time rate of change of the space temperature during each recovery period for the day;

calculating an updated recovery ramp rate equal to a product of the temperature recovery ramp rate for the previous similar (AM or PM) recovery period and a ratio of the temperature difference between the space temperature and the outdoor air temperature at the start of the current recovery period to a temperature difference between the space temperature and the ambient air temperature at the start of the previous similar (AM or PM) recovery period and the ratio of the thermal time constant for the previous similar (AM or PM) recovery period to the thermal time constant for the current recovery period, and storing the product as the recovery ramp rate for the current recovery period in a location of the operand memory;

at the end of intervals of predetermined length, calculating a time difference equal to the difference between the occupancy time and the present time and recording the time difference in the operand memory;

after a time difference has been recorded, calculating and recording in the operand memory a ramp delta equal to a product of the latest time difference recorded and the ramp rate;

calculating and recording in the operand memory a ramp set point equal to at least one of the differences between the occupancy temperature and the ramp delta and the sum of the occupancy temperature and the ramp delta; and comparing the ramp set point with the space temperature, and when a selectable relationship between the ramp set point and the space temperature exists, issuing an operation signal to turn the plant "on" or "off."

4. A system for optimizing a ramp rate after a setback in a space temperature and time, and the setting of an occupancy temperature and time, having a recovery period wherein the space temperature is changed by a plant that heats or cools, to the occupancy temperature at the occupancy time, the plant being controlled by a thermostat having space and outdoor temperature sensors, having heating and cooling modes, having a processor for executing instructions stored as a program and having an executive for scheduling the instructions, and having a program flow control, having a memory for storing the program and calculation results, having a clock for providing present time of day, the program having a recovery flag set at the start of a temperature recovery period and cleared when recovery period has been completed and/or at the start of each setback period, and the program having a check flag that is set when the plant is turned on and cleared when plant is turned off, comprising:

a first decision element that functions if it receives a go signal from the executive, and determines whether a current on/off status of the plant is the same as a past on/off status of the plant during a previous pass through and said first decision element outputs either a yes or a no;

a second decision element that functions if it receives a no from said first decision element, and determines whether the status of the plant has changed from an off during the previous pass through to an on, and if so, said second decision element outputs a yes and if not, a no;

a first calculation element that functions if it receives a yes from said second decision element, and calculates a difference between a current space temperature and an outdoor temperature and stores the difference in the memory, stores the current space temperature and present time of day in the memory, sets the check flag and returns the program flow to the executive;

a third decision element that functions if it receives a yes from said first decision element, and checks a status of the check flag, if the check flag is set then the program flow is returned to the executive, and if the check flag is not set, then said third decision element outputs a not set;

a second calculation element that functions if it receives a no from said second decision element, and stores the current space temperature and present time of day in the memory, calculates a time rate of change of the space temperature after a most recently completed plant on cycle, calculates a thermal time constant of the most recently completed plant on cycle, stores the time rate of change and the thermal time constant in the memory, and then clears the check flag and outputs a clear check flag;

a fourth decision element that functions if it receives a not set from said third decision element or a clear check flag from said second calculation element, and returns the program flow to the executive if a test interval has not ended and outputs a yes if the test interval has ended;

a fifth decision element that functions if it receives a yes from said fourth decision element, and tests a condition of the recovery flag, outputs a set if the recovery flag is set and outputs a not set if the recovery flag is not set;

a third calculation element that functions if it receives a not set from said fifth decision element, and calculates and stores in the memory a difference between the current space temperature and the outdoor temperature, calculates and stores in the memory a recovery ramp rate to be used in a next recovery period, calculates and stores in the memory a time difference of the occupancy time and present time of day, calculates and stores in the memory a ramp delta, and outputs a calculation completed signal;

a sixth decision element that functions if it receives a calculation completed signal from said third calculation element, and outputs a cool signal if the thermostat is in a cooling mode and outputs a heat signal if the thermostat is in a heating mode;

a fourth calculation element that functions if it receives a heat signal from said sixth decision element, and calculates a ramp set point which is the occupancy temperature minus the ramp delta, and then outputs a calculation completed signal;

a seventh decision element that functions if it receives a calculation completed signal from said fourth calculation element, and determines whether the current space temperature is less than the ramp set point, and if not, it outputs a no and returns the program flow to the executive, and if so it outputs a yes and signals the plant to turn on; and a fifth calculation element that functions if the plan is signaled to turn on by said seventh decision element, and calculates and stores in the memory a difference between the current space temperature and the outdoor temperature, stores in the memory the current space temperature and present time of day, sets the recovery flag and returns the program control to the executive.

5. The system of claim 4 further comprising:

a sixth calculation element that functions if it receives a cool signal from said sixth decision element, and calculates a ramp set point which is a sum of the occupancy temperature and the ramp delta, and then outputs a calculation completed signal;

an eighth decision element that functions if it receives a calculation completed signal from said sixth calculation element, and determines whether the current space temperature is greater than the ramp set point, and if not, it outputs a no and returns the program flow to the executive, and if so it outputs a yes and signals the plant to turn on; and a seventh calculation element that functions if the plant is signaled to turn on by said eighth decision element and calculates and stores in the memory a difference between the current space temperature and the outdoor temperature, and stores in the memory the current space temperature and present time of day, and sets the recovery flag and returns the program control to the executive.

6. The system of claim 5 further comprising:

an ninth decision element that functions if it receives a set from said fifth decision element, and outputs a cool signal if the thermostat is in a cooling mode and outputs a heat signal if the thermostat is in a heating mode;

a tenth decision element that functions if it receives a heat signal from said ninth decision element, and if the current space temperature is not greater than the occupancy temperature minus a control band offset then the program control is returned to the executive, and if the current space temperature exceeds the occupancy temperature minus the control band offset then a yes it outputted;

an eighth calculation element that functions if a yes is received from said tenth decision element, and calculates and stores in the memory an updated ramp rate and outputs a calculation completed signal;

an eleventh decision element that functions if it receives a cool signal from said ninth decision element, and if the current space temperature is not less than the occupancy temperature plus a control band offset then the program control is returned to the executive, and if the current space temperature is less than the occupancy temperature plus the control band offset then a yes is outputted;

a ninth calculation element that functions if it receives a yes from said eleventh decision element, and calculates and stores in the memory an updated ramp rate, and outputs a calculation completed signal; and a tenth calculation element that functions if it receives a calculation completed signal from said eighth or ninth calculation element, and calculates and stores in the memory a thermal time constant that is a ratio of the difference of the space and outdoor temperatures at a start of recovery period to the ramp rate for the about to be completed recovery period, clears the recovery flag when the recovery period is completed, and then returns the program control to the executive.

7. The system of claim 6 wherein the updated ramp rate of said eighth and ninth calculation elements is a difference of the space temperature at the start of the recovery period and the current space temperature, divided by a difference of the ramp set point and present time of day.

8. The system of claim 6 wherein the updated ramp rate is equal to a former ramp rate plus a difference which is divided by 2 to an nth power, wherein the difference is the occupancy time minus present time of day and n is an integer from 0 to 20.

9. A thermostat system in a space having a current space temperature that changes to an occupancy temperature is achieved at an occupancy time, the changing of the current space temperature caused by a heater or cooler, having a recovery start time that occurs at a recovery time prior to the occupancy time, the recovery time being a period of time needed for the current space temperature to be changed to the occupancy temperature, the recovery time determined by an optimized recovery ramp rate of a certain amount of space temperature change per unit time, comprising:

a first temperature sensor for sensing the current space temperature;

a second temperature sensor for sensing current outdoor ambient temperature of air external but proximate to the space;

a processor, connected to said first and second temperature sensors, having a memory, instruction processor and a clock;

a space temperature changing unit having a heater and a cooler; and a heat and cool mode selector connected to said processor and said space temperature changing unit; and wherein:

the recovery start time is at the beginning of a period of recovery time prior to the occupancy time when the current space temperature is to be approximately the same as the occupancy temperature, the recovery time being determined by a recovery ramp rate of a certain amount of temperature change per unit time; and the recovery ramp rate is based on (1) a difference between the current space temperature and the current outdoor ambient temperature at the recovery start time, (2) a thermal time constant for the recovery time based on a ratio of a temperature difference between the space temperature and the outdoor ambient temperature during a most recent plant "on" cycle to a time rate of change of the current space temperature during the most recent plant "on" cycle, (3) a thermal time constant for a previous period of a recovery time having a similar time of day, and (4) a recovery ramp rate for the previous period of the recovery having the similar time of day.

10. A method for optimizing a temperature recovery ramp rate of a thermostat having current space temperature and outdoor temperature sensors, a processor, connected to the temperature sensors, for calculating and comparing information, for recording and accessing information to and from an operand memory connected to the processor, for noting time from a clock connected to the processor, and for issuing operation signals, in a space having a space temperature to be controlled relative to a set occupancy temperature and occupancy time, comprising:

recording by the processor in the operand memory, space temperatures and outdoor temperatures;

setting and recording in the operand memory, at least one occupancy temperature and one occupancy time which follows a setback temperature interval;

recording in the operand memory a present time of day;

calculating and recording in the operand memory a ramp rate;

calculating and recording in the operand memory thermal time constant of a current recovery period, and a thermal time constant for a previous similar (AM or PM) recovery period, during a plant "on" period wherein a plant is changing space temperature to approach occupancy temperature;

calculating and recording in the operand memory differences between space temperatures and corresponding outdoor air temperatures;

calculating and recording in the operand memory a time rate of change of the space temperature during the plant "on" period;

calculating and recording in the operand memory a time rate of change of the space temperature during each recovery period for the day; and calculating an updated recovery ramp rate equal to a product of the temperature recovery ramp rate determined at the end of the previous similar (AM or PM) recovery period and a ratio of the temperature difference between the space temperature and the outdoor air temperature at the start of the current recovery period to a temperature difference between the space temperature and the ambient air temperature at the start of the previous similar (AM or PM) recovery period and the ratio of the thermal time constant for the previous similar (AM or PM) recovery period to the thermal time constant for the current recovery period, and storing the product as the recovery ramp rate for the current recovery period in a location of the operand memory.

11. The method of claim 10 further comprising:

at the end of intervals of predetermined length, calculating a time difference equal to the difference between the occupancy time and the present time and recording the time difference in the operand memory;

after a time difference has been recorded, calculating and recording in the operand memory a ramp delta equal to a product of the latest time difference recorded and the ramp rate;

calculating and recording in the operand memory a ramp set point equal to at least one of the differences between the occupancy temperature and the ramp delta and the sum of the occupancy temperature and the ramp delta; and comparing the ramp set point with the space temperature, and when a selectable relationship between the ramp set point and the space temperature exists, issuing an operation signal to turn the plant "on" or "off."

* * * * *